Sept. 12, 1933.  W. E. PETTERSEN  1,926,306
APPARATUS FOR REMOVING FOREIGN MATTER FROM A TRAVELING SHEET OF MATERIAL
Filed Feb. 4, 1932
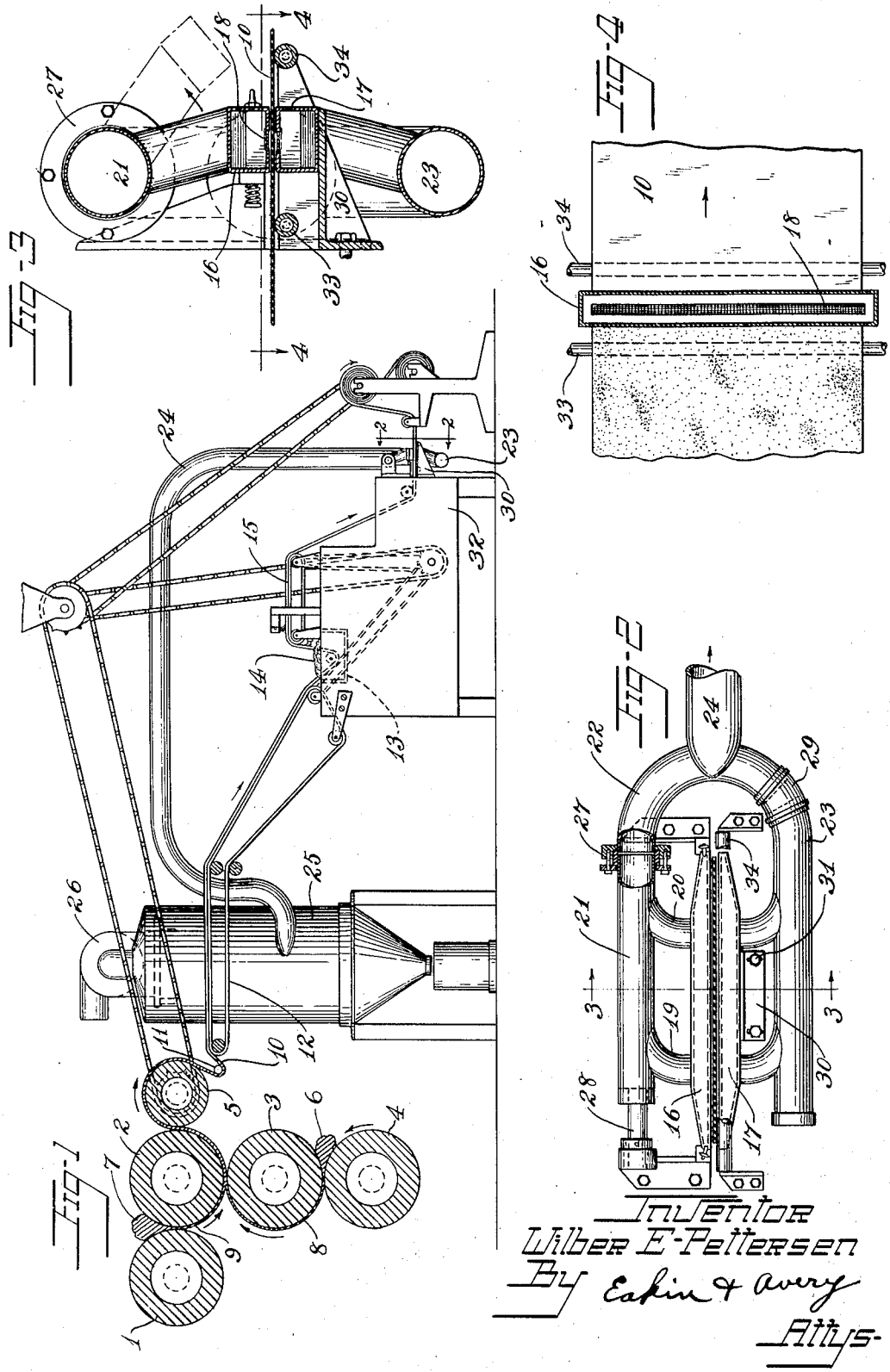

Patented Sept. 12, 1933

1,926,306

UNITED STATES PATENT OFFICE 1,926,306

APPARATUS FOR REMOVING FOREIGN MATTER FROM A TRAVELING SHEET OF MATERIAL

Wilber E. Pettersen, Akron, Ohio, assignor to The B. F. Goodrich Company, New York, N. Y., a corporation of New York Application February 4, 1932. Serial No. 590,909

2 Claims. (Cl. 15—15)

This invention relates to apparatus for removing foreign matter from a traveling web of material. It is particularly useful in removing excess dust from dusted materials such as sheet rubber or similar adhesive material to which a layer of dust has been applied to reduce or eliminate its adhesiveness.

The principal objects of the invention are to provide efficiency, low cost of operation and speed without injury to the web of material.

Other objects are to provide adjustability and simplicity of apparatus.

Further objects will appear from the following description and the accompanying drawing.

In the drawing:

Fig. 1 is a side elevation, partly in section, of apparatus for calendering adhesive sheets of material, for applying a dust coating thereto, and for removing excess dust from its surface and recovering the dust, the frame of the calender being omitted.

Fig. 2 is an enlarged elevation taken on line 2—2 of Fig. 1, showing only the dust removing mechanism, the exhaust pipe being broken away in part to show the swing joint therein, one of the guide rolls being broken away in part.

Fig. 3 is a sectional elevation on line 3—3 of Fig. 2.

Fig. 4 is a sectional plan view, taken on line 4—4 of Fig. 3, part of the apparatus and the sheet of material being broken away.

Referring to the drawing, and particularly to Fig. 1, the numerals 1, 2, 3, 4, and 5 designate the rolls of a calender. The numerals 6 and 7 designate banks of plastic material being fed between the rolls 3 and 4 and 1 and 2 respectively to form sheets 8 and 9 which pass between rolls 2 and 3 and between rolls 2 and 5 where they are plied to form a single sheet 10 which passes under a guide roller 11 and onto a conveyor belt 12.

The conveyor belt carries the adhesive sheet to a position where it is delivered into a dust box 13 containing dusting material 14 which is taken up by the sheet. The sheet is drawn through the dust box by a conveyor belt 15 and passes from the conveyor to the apparatus for removing the excess dust.

The apparatus for removing the excess dust or other foreign material, more clearly shown in Figs. 2, 3 and 4, comprises a pair of similar boxes 16 and 17. These boxes are positioned across the sheet or web of material one above and one below, with their web-facing sides spaced apart by a distance slightly greater than the thickness of the web. Each box is provided with a slot 18 which preferably is relatively narrow as compared to the width of the face of the box and in the center thereof. This slot is covered with wire netting to provide an apertured zone remote from the margins of the box. Box 16 is connected by pipes 19 and 20 to one leg 21 of a T-shaped manifold 22. Box 17 is similarly connected to the other leg 23. The pipe 24 constituting the stem of the T is extended to connect with a dust collector 25 of the cyclone or any other suitable type (not shown). A blower 26, driven by any source of power, not shown, exhausts the dust collector 25 and causes a sub-atmospheric pressure in the pipe 24 and consequently in the boxes 16 and 17 connected thereto. The atmospheric air flows between the sheet or web of the material and the faces of the boxes 16 and 17 and through the slots 18, the reduction in pressure incident to the high velocity of the air through the narrow passages causing the sheet of material to be vibrated at a high velocity between the faces of the boxes 16 and 17, the velocity increasing and the fluid pressure on the adjacent face of the sheet following as either of the narrow passages is enlarged by movement of the sheet toward the one or the other of the boxes, and the vibrating forces also possibly being contributed to by reversal of kinetic effect at the junction of the pipes 22 and 23 with the pipe 24. The impact of the web against the apertured surface loosens the dust which is exhausted while suspended in the air and is delivered to the dust separator.

In order to facilitate threading the sheet of material through the dust removing device, one of the legs 21 of the exhaust pipe is provided with a swing joint 27 and a bearing 28, about which the pipe 21 carrying box 16 may be rotated in the direction indicated by the arrow in Fig. 3. Pipes 19 and 20 are inclined so that the center of rotation of pipe 21 is above one edge of box 16 to make possible this swinging movement.

As the distance between the boxes 16 and 17 influences the operation of the device by changing the period of vibration of the web, a flexible section 29 is provided between the pipes 23 and 24 and an adjustable bracket 30 is located on the box 17 and held by bolts 31 to the frame 32 of the machine, for varying the spacing of the boxes.

As the sheet of material passes between the boxes 16 and 17 it is guided by rollers 33 and 34. These rolls are preferably spaced equidistant from the center line of the boxes and are so mounted as to be adjustable toward and away from the boxes, as their location also influences the period of vibration of the sheet material.

It is also desirable to provide for driving the blower 26 at different speeds as the degree of vacuum attained in the boxes may then be adjusted to suit the material to be cleaned. Where thin sheet rubber is to be dusted the vacuum may be between four and nine inches of water, whereas with heavier sheets of material a more perfect vacuum is desirable.

While the device is particularly adapted to the cleaning of sheet rubber and other impervious sheet materials, it may be used in the cleaning of textile materials of close weave or other more pervious materials.

As the sheet material travels constantly through the device no appreciable distortion of the material, even with a thin vulcanized rubber sheet, is noticeable. The device is more effective in removing dust from an unvulcanized rubber sheet than brushing devices formerly used, as the extremely rapid vibration of the web dislodges more of the dust. The web strikes the apertured faces of the boxes at a high velocity but is immediately forced therefrom by the ensuing decrease in pressure on its opposite side.

While the device is particularly useful in removing dust it is apparent that foreign matter in the form of moisture can be removed from a traveling web of absorbent material by the use of the device.

I claim:

1. Apparatus for removing foreign matter from a traveling web of material, said apparatus comprising a pair of suction devices having wholly rigid suction faces presented to each other in closely spaced, face-to-face relation, each suction face including oppositely disposed imperforate portions defining between them a long passage, means on opposite sides of the suction devices for supporting the web normally free of the faces of the suction devices and for drawing it through the said passage in a course which is substantially straight at and throughout the extent of the passage, and means for drawing air into the suction devices through the spaces between the web and the respective suction faces whereby rapidly reversing differential fluid pressure will be applied to the web and cause it to vibrate between the suction faces.

2. Apparatus for removing foreign matter from a traveling web of material, said apparatus comprising a pair of suction boxes formed with perforate suction faces juxtaposed to each other and means for passing the web between them normally out of contact with the faces, the juxtaposed faces of the boxes having imperforate areas of such extent in close relation to each other as to provide, as an incident of alternating velocity effects of air passing between them respectively and the web, a rapid reversal of differential fluid pressures on the two sides of the web throughout a sufficient area to cause vibration of the web, the orifices of the suction faces being too small to permit substantial bagging of the web thereinto, and the amplitude of the vibration throughout the said area being substantially uniform and limited by contact of the web with the juxtaposed faces of the boxes, and means for drawing air into the suction boxes through the spaces between the web and the respective boxes whereby rapidly reversing differential fluid pressure will be applied to the web and cause it so to vibrate.

WILBER E. PETTERSEN.